US012649392B2

(12) United States Patent (10) Patent No.: US 12,649,392 B2
Newberry et al. (45) Date of Patent: Jun. 9, 2026

(54) DRIVE MECHANISM FOR A SEAT CUSHION LENGTH EXTENDER

(71) Applicant: Adient US LLC, Plymouth, MI (US)

(72) Inventors: John David Newberry, Van Buren Township, MI (US); Scott Allen Profozich, Canton, MI (US); Pritam Rajaram Mali, Pune (IN)

(73) Assignee: Adient US LLC, Plymouth, MI (US)

( * ) Notice: Subject to any disclaimer, the term of this patent is extended or adjusted under 35 U.S.C. 154(b) by 120 days.

(21) Appl. No.: 18/802,123

(22) Filed: Aug. 13, 2024

(65) Prior Publication Data

US 2024/0399938 A1      Dec. 5, 2024

Related U.S. Application Data

(63) Continuation-in-part of application No. PCT/US2024/029347, filed on May 15, 2024, and a continuation-in-part of application No. PCT/US2024/029070, filed on May 13, 2024.

(60) Provisional application No. 63/502,531, filed on May 16, 2023.

(51) Int. Cl.
B60N 2/02           (2006.01)
B60N 2/90           (2018.01)
(52) U.S. Cl.
CPC ....... B60N 2/0284 (2013.01); B60N 2/02253 (2023.08); B60N 2/02258 (2023.08); B60N 2/929 (2018.02)
(58) Field of Classification Search
CPC .............. B60N 2/0284; B60N 2/02258; B60N 2002/0288
See application file for complete search history.

(56) References Cited

U.S. PATENT DOCUMENTS

| | | | |
|---|---|---|---|
| 2,636,550 A | 4/1953 | Poyer | |
| 7,458,637 B2 | 12/2008 | Norman et al. | |
| 7,997,648 B2 * | 8/2011 | Becker ................. | B60N 2/0284 |
| | | | 297/284.11 |
| 8,162,397 B2 | 4/2012 | Booth et al. | |
| 9,016,783 B2 | 4/2015 | Line et al. | |
| 9,016,784 B2 | 4/2015 | Line et al. | |
| 9,756,408 B2 | 9/2017 | Ferretti et al. | |
| 9,809,132 B2 | 11/2017 | Bortolon et al. | |

(Continued)

FOREIGN PATENT DOCUMENTS

| | | |
|---|---|---|
| DE | 19801893 A1 | 7/1999 |
| DE | 102008049923 A1 | 8/2009 |

(Continued)

OTHER PUBLICATIONS

World Intellectual Property Organization, International Search Report and Written Opinion for International Application No. PCT/US2024/029347, dated Sep. 20, 2024, 6 pages.

(Continued)

*Primary Examiner* — Syed A Islam

(74) *Attorney, Agent, or Firm* — Marshall & Melhorn, LLC

(57)           ABSTRACT

A drive mechanism for a seat cushion length extender may have a lower slide, an upper slide slidably engaged with the lower slide, a linkage member having a threaded rod having a flange end with an aperture therethrough and a pin located through the linkage flange aperture and the linkage member aperture.

20 Claims, 17 Drawing Sheets

(56) References Cited

U.S. PATENT DOCUMENTS

| | | | |
|---|---|---|---|
| 9,902,293 | B2 | 2/2018 | Line et al. |
| 10,471,851 | B2 * | 11/2019 | Loppolo ............ B60N 2/02253 |
| 10,611,277 | B2 | 4/2020 | Engelke et al. |
| 10,640,011 | B2 | 5/2020 | Anzenberger et al. |
| 11,440,450 | B2 | 9/2022 | Seibold |
| 11,938,845 | B2 | 3/2024 | Kimbara |
| 2006/0061167 | A1 | 3/2006 | Adragna et al. |
| 2009/0091172 | A1 | 4/2009 | Kim |
| 2009/0174242 | A1 | 7/2009 | Kohl et al. |
| 2014/0203607 | A1 | 7/2014 | Line et al. |
| 2019/0135139 | A1 | 5/2019 | Ioppolo et al. |
| 2019/0225118 | A1 | 7/2019 | Tindall et al. |
| 2020/0138202 | A1 | 5/2020 | Cordes et al. |
| 2020/0214916 | A1 | 7/2020 | Beyer et al. |
| 2022/0072982 | A1 | 3/2022 | Shingne et al. |

FOREIGN PATENT DOCUMENTS

| | | |
|---|---|---|
| DE | 102009012776 B3 | 9/2010 |
| DE | 102014004111 A1 | 9/2015 |
| DE | 102017105884 A1 | 10/2017 |
| DE | 102018123873 A1 | 3/2019 |
| DE | 102019113256 A1 | 3/2020 |
| DE | 102019216331 A1 | 4/2021 |
| DE | 102019216976 A1 | 4/2021 |
| DE | 102021208282 A1 | 3/2022 |
| DE | 102021116551 A1 | 12/2022 |
| DE | 102023103659 A1 | 9/2023 |
| DE | 102023103432 A1 | 8/2024 |
| DE | 102016219105 B4 | 11/2024 |
| EP | 2790958 B1 | 12/2015 |
| EP | 3099524 B1 | 11/2019 |
| EP | 3768548 B1 | 5/2022 |
| EP | 3763560 B1 | 6/2022 |
| FR | 2672855 A1 | 8/1992 |
| KR | 20110137994 A * | 12/2011 ........... B60N 2/0284 |
| KR | 20110137995 A | 12/2011 |
| KR | 20170040875 A * | 4/2017 ........... B60N 2/0284 |
| KR | 102042426 B1 | 11/2019 |
| KR | 102281636 B1 | 7/2021 |
| KR | 102457330 B1 | 10/2022 |
| WO | 2008116180 A2 | 9/2008 |
| WO | 2023005876 A1 | 2/2023 |
| WO | 2023102395 A1 | 6/2023 |

OTHER PUBLICATIONS

World Intellectual Property Organization, International Search Report and Written Opinion for International Application No. PCT/US2024/029070, dated Aug. 8, 2024, 9 pages.

European Patent Office Extended European Search Report—6 pages Dated Jan. 7, 2026.

* cited by examiner

DRIVE MECHANISM FOR A SEAT CUSHION LENGTH EXTENDER

FIELD

The presently disclosed subject matter relates to a drive mechanism for a seat cushion length extender seat which may be used in a vehicle.

BACKGROUND

Conventional seats, particularly those employed in a vehicle, may include a seat back assembly connected to a seat base assembly and a headrest assembly. The seat base assembly may include a seat cushion length extender. Prior art seat cushion length extenders, including their drive mechanisms, require multiple high-cost components. Further, the complexity of the prior art seat cushion length extenders and their associated drive mechanisms requires intricate manufacturing and assembly processes which increases seat cost. For this reason, cushion extenders are typically only offered as an option in premium or high-end vehicles.

A further drawback of conventional seat cushion length extenders is that they only actuate a middle portion of the cushion, which is supposed to accommodate taller occupants, but these systems do not necessarily extend across a wide enough portion of the cushion to accommodate for leg splay of the occupants. As such, the taller occupants, even with the typical seat cushion length extenders deployed, do not obtain optimized support and comfort rear of the knee when seated in a natural manner. There is also a need for the seat cushion length extenders to retract to provide smaller occupants appropriate leg support and leg clearance for the small occupant to bend their legs without interference.

In view of the disadvantages associated with the prior art, it would be advantageous to provide a seat cushion length extender with a drive mechanism that provides the possibility for full seat width comfort and accommodation for varying sizes of occupants, without part complexity, while maintaining an integrated appearance when trimmed. The new cushion length adjuster and drive mechanism should also minimize expense and complexity of the prior art designs.

SUMMARY

A drive mechanism for a seat cushion length extender may have a lower slide having two lateral side portions bounding a central portion, wherein an area of the central portion is recessed below the lateral side portions, and another portion of the central portion comprises a motor aperture. The mechanism may also have an upper slide having rails slidably engaged with the lateral side portions and at least one linkage flange with an aperture extending from a lower surface of the upper slide. The mechanism may also have a linkage member comprising a threaded rod having a flange end with an aperture therethrough. The mechanism may also have a pin located through the linkage flange aperture and the linkage member aperture.

In another aspect the lower slide, the upper slide and the threaded rod each have longitudinal axis that are parallel to one another.

In another aspect the lateral side portions of the lower slide define slide channels.

In another aspect the recessed area of the central portion is longitudinally aligned with the longitudinal axis of the threaded rod.

In another aspect the central portion has a motor mount with a depression therein for the threaded rod, wherein two transmission fastener apertures are located on either side of the depression.

In another aspect the motor mount at least partially bounds the motor aperture.

In another aspect one portion of a motor extends into the motor mount and the motor extends at an acute angle to a lower surface of the lower slide.

In another aspect the rails of the upper slide are located laterally outboard of a central portion of the upper slide.

In another aspect pusher receptacles are located at laterally outboard portions along a forward portion of the upper slide.

In another aspect the recessed area of the lower slide is sized and shaped to selectively receive the linkage flange of the upper slide.

In another aspect a pinion aperture is located through the lower slide in a forward central portion of the lower slide.

In another aspect the transmission fasteners extend into the motor mount parallel to the threaded rod.

In another aspect the pin extends transverse to the threaded rod.

In another aspect the threaded rod extends parallel to the rails.

In another aspect each of the upper and lower slides are one-piece, unitary and integrally formed.

DETAILED DESCRIPTION

Figure 2:
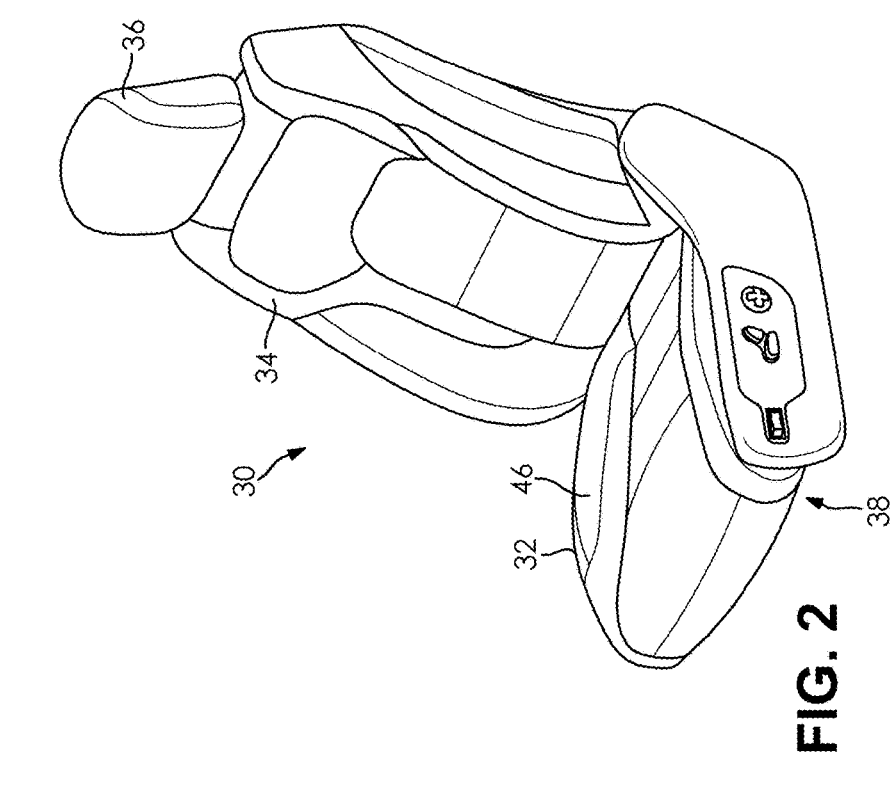
FIG. 2 is a schematic perspective view of one embodiment of a seat system with a retracted seat base assembly.

It is to be understood that the presently disclosed subject matter may assume various alternative orientations and step sequences, except where expressly specified to the contrary. It is also to be understood that the specific assemblies and systems illustrated in the attached drawings, and described in the following specification are simply exemplary embodiments of the concepts herein. Hence, specific dimensions, directions or other physical characteristics relating to the embodiments disclosed are not to be considered as limiting, unless expressly stated otherwise. Also, although they may not be, like elements in various embodiments described herein may be commonly referred to with like reference numerals within this section of the application.

Figure 1:
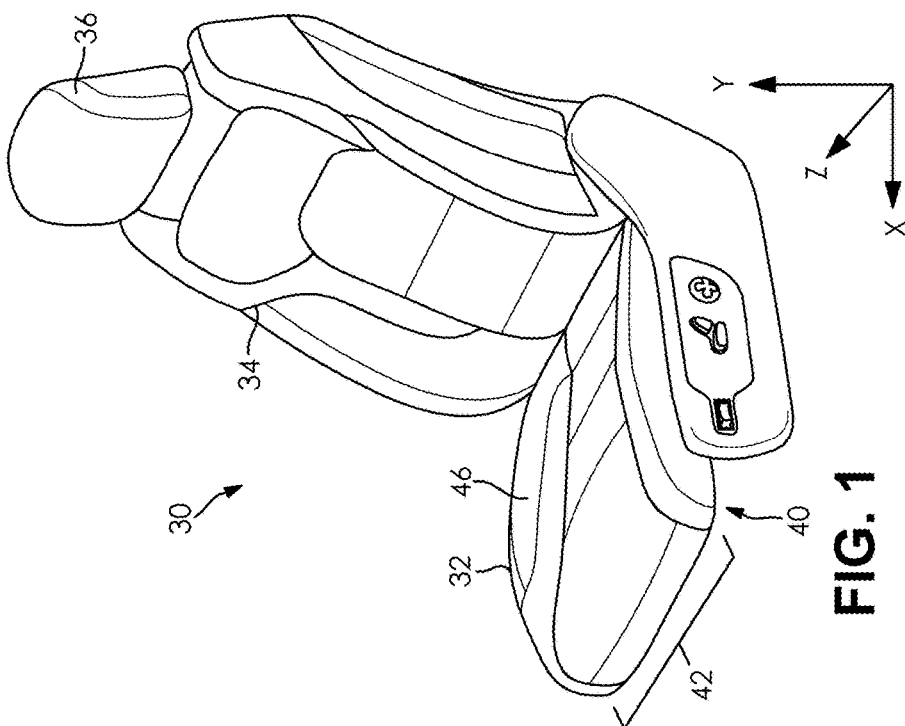
FIG. 1 is a schematic perspective view of one embodiment of a seat system with an extended seat base assembly.
Figure 3:
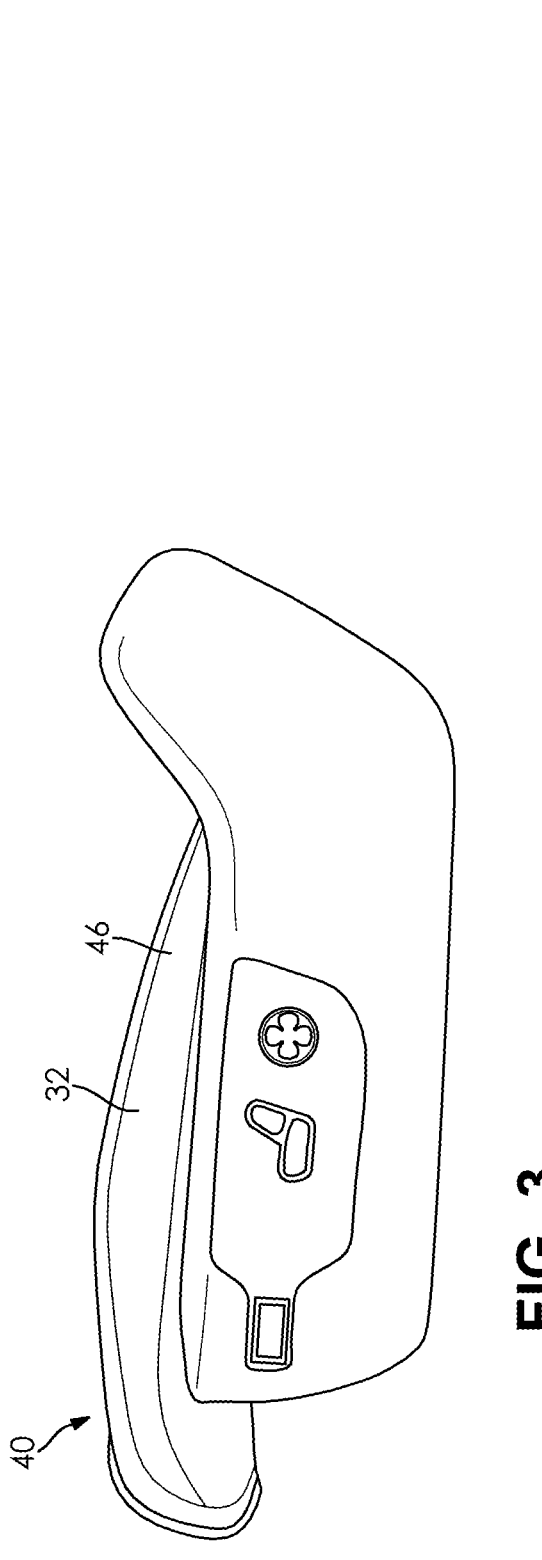
FIG. 3 is a schematic side view of the seat base assembly in the extended condition.
Figure 4:
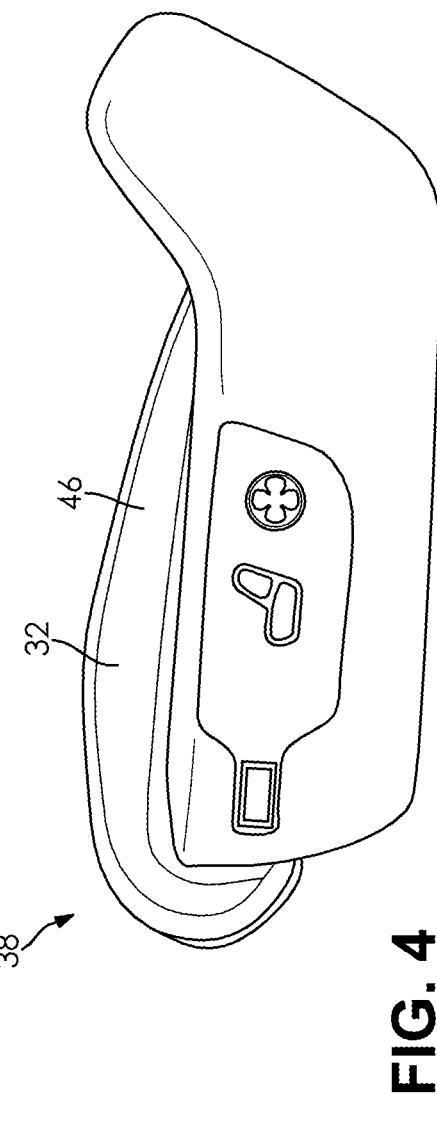
FIG. 4 is a schematic side view of the seat base assembly in the retracted condition.
Figures 5, 6:
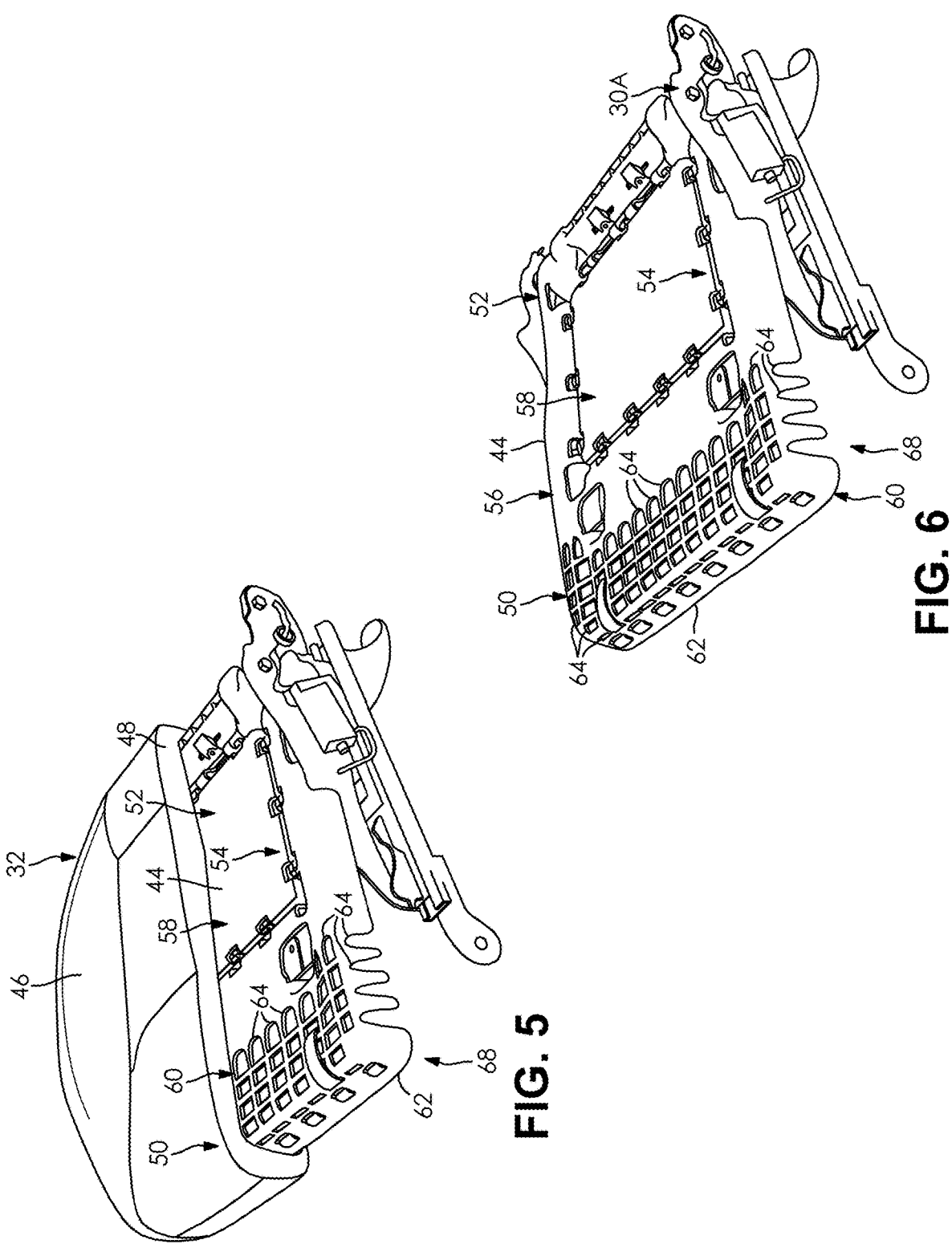
FIG. 5 is a schematic upper perspective view of components of the seat base assembly in an extended condition.
FIG. 6 is a schematic upper perspective view of components of the seat base assembly in an extended condition.

FIGS. 1 and 2 show a seat system 30 for a motor vehicle (not depicted) according to an embodiment of the presently described subject matter. The seat system 30 may extend along a longitudinal direction X of the vehicle, a vertical direction Y of the vehicle and a lateral direction Z of the vehicle. The longitudinal direction X may be such as along a common travel direction of the vehicle such as forward and reverse. The lateral direction Z may be such as side to side and the vertical direction Y may be such as from the floor to the roof of the vehicle. It can readily be appreciated that while one set of directions is mentioned for the seat system 30, the seat system 30 may be angled or tilted within a vehicle offset from these directions. Further, the seat system 30 may be used in applications other than motor vehicles.

The seat system 30 may comprise a seat base assembly 32, a seat back assembly 34, and a headrest assembly 36. The seat back assembly 34 may be coupled to the seat base assembly 32 and the headrest assembly 36. In certain embodiments, the seat base assembly 32 may be movable relative to a floorboard (not shown) of the vehicle, the seat back assembly 34 may be movable relative to the seat base assembly 32, and the headrest assembly 36 may be movable relative to the seat back assembly 34. The seat base assembly 32 may be configured to support a buttock portion and leg portion of an occupant while the seat back assembly 34 may be configured to support a back region of the occupant.

The seat system 30 may also include a seat frame (not shown) comprising a seat base frame portion (30A), a seat back frame portion (not shown), and a headrest frame portion (not shown). The frame portions may be movingly coupled together using any suitable means as desired. Any suitable material may be employed to produce the frame portions as desired. For example, each of the frame portions may be formed from a rigid metal material.

FIGS. 1-4 depict the seat base assembly 32 in two conditions. The two conditions are a longitudinally retracted condition 38 and a longitudinally extended condition 40. The seat base assembly 32 may also exist in any longitudinal condition between the retracted and extended conditions 38, 40. The seat base assembly 32 may also have tilt, bolster, swivel and other adjustments.

The adjustable seat base assembly 32 can accommodate a wide variety of occupants regardless of their size or shape. Via the structures and operations described herein the adjustable seat base assembly 32 can provide full longitudinal under-leg support across a width 42 of the seat base assembly 32 that may be needed for occupants of various sizes and shapes.

The seat base assembly 32 may include a seat base substrate 44 coupled to the seat base frame portion, an optional cushioning member (discussed later) disposed on the seat base substrate 44, and a seat cover 46 disposed over the cushioning member and/or seat base substrate 44.

FIGS. 5-11 depict one embodiment of the seat base substrate 44. The seat base substrate 44 may be a single, one-piece component, however, the seat base substrate 44 may be a multi-piece component if desired. In certain embodiments, the seat base substrate 44 may be configured with a size and shape to cooperate with a rigid seat base structure such as the seat base frame portion 30A. The seat base substrate 44 may be formed of an elastomeric material such as a thermoplastic elastomer (TPE) material. Various types of the TPE material may be employed such as at least one of a styrenic block copolymer, thermoplastic olefinic elastomer, and/or thermoplastic vulcanisate.

In certain embodiments, the seat base substrate 44 provides conforming support that flexes with the size, shape and/or posture of the occupant and accommodates differently sized occupants with less need for active adjustments to the seat system 30. In certain embodiments, the seat base substrate 44 may have a flexural modulus in a range of about 200 MPa to about 800 MPa, preferably about 290 MPa, and a tensile modulus in a range of about 10 MPa to about 300 MPa, preferably about 280 MPa. It is understood that the seat base substrate 44 may be formed from any suitable material having a desired flexural modulus. It is further understood that the seat base substrate 44 may be formed by any suitable method as desired such as an injection molding process, a thermoforming process, a compression molding process, a blow molding process, a vacuum casting process, a three-dimensional printing process, and the like.

The seat base substrate 44 formed from the TPE material may exhibit both thermoplastic and elastomeric properties which permit flexibility of the seat base substrate 44 while militating against a permanent set thereof. As such, the seat base substrate 44 has an ability to stretch to moderate elongations and return to an original shape. Hence, the seat base substrate 44 may be relatively thin as compared to commonly known seat base substrates. In certain embodiments, a thickness of the seat base substrate 44 may be in a range of about 1 mm to about 5 mm, preferably in a range of about 1.5 mm to about 3.0 mm, and more preferably about 2 mm or less.

Since the seat base substrate 44 adapts to the occupant with conforming support, a cushioning member 48 may or may not be used in whole or in part with the seat base substrate 44. One embodiment of a cushioning member may be seen in FIG. 5. When a cushioning member 48 is used, it may be relatively thin as compared to commonly known cushioning members due to the comfort provided by the seat base substrate 44. In certain embodiments, a thickness of the cushioning member 48 may be in a range of about 15 mm to about 25 mm, preferably 20 mm or less.

In other embodiments, the seat base substrate 44 formed from the TPE material may eliminate a need for the cushioning member in the seat base assembly 48. As a non-limiting example, a thickness of the seat base assembly 32 may be about 45 mm less than commonly known seat base assemblies. Accordingly, in certain embodiments, the seat base substrate 44 results in a reduction in mass and size of the seat base assembly 32 as compared to commonly known seat base assemblies. Such a reduction in the mass and size of the seat base assembly 32 improves manufacturability and decreases costs, while maintaining comfortability. Furthermore, the seat base assembly 32 minimizes a consumption of valuable space within a passenger compartment of the vehicle. As a result, a size of the passenger compartment of the vehicle, and therefore, a size of the vehicle in its entirety, may be reduced, which also results in a reduction in mass and energy consumption of the vehicle. It should be appreciated that each of the seat base substrate 44, the cushioning member 48, and the seat base assembly 32 may have any thickness as desired.

From the above, it can be appreciated that the seat base substrate 44 may function alone as both a suspension for the seat system 30 as well as a structural component of the seat system 30. For example, it may be that other springs or biasing members are not required with the seat base assembly 32 to provide a suspension between the seat frame. Further, it may be that no other wire seat support structures or structural members are required for the seat base assembly 32 between the seat frame.

The seat base substrate 44 may have a front portion 50, a rear portion 52, a first side portion 54 and a second side portion 56. The seat base substrate 44 further includes a main support portion 58 formed between the front and rear portions 50, 52 and between the first and second side portions 54, 56.

As best seen in FIGS. 5-8 and 10, the seat base assembly 32 may further include an adjustable support 60. The adjustable support 60 may be configured to enhance comfort and enable support for the various driving positions and body size of the occupant. Additionally, the adjustable support 60 provides simplified execution combined with improved functionality and usability over the prior art. As a non-limiting example, the adjustable support 60 may be configured to be selectively extended behind the knees of an occupant having a larger body size with legs naturally splayed. As another non-limiting example, the adjustable support 60 may be configured to be selectively retracted behind the knees of an occupant having a smaller body size so as not to interfere with the back of the calves of the occupant. In certain embodiments, the adjustable support 60 may laterally extend entirely, or just a portion of, the seat base assembly 32 to provide a desired comfort, support and/or accommodate leg splay of the occupant. At least a portion of the adjustable support 60 may be formed from the same material as the seat base substrate 44. In some embodiments, the adjustable support 60 may be unitary, one-piece and integrally formed with the seat base substrate 44.

The adjustable support 60 may have slots extending entirely or partially through the thickness of the support 60. The adjustable support 60 may also have relief cuts such as along a perimeter 62 of the adjustable support 60. Together these items will be designated as adjusters 64. The adjusters

64 may be in any number and have any shape, size, and configuration as desired. The adjusters 64 can be located at predetermined locations and in any number to tune the adjustable support 60 to the application. For example, the adjusters 64 might be used to control at least one of rigidity/flexibility, shape, and conformability of the adjustable support 60. For example, the adjusters 64 might be used to increase or decrease the flexibility of the adjustable support 60 and/or increase an airflow through and around the adjustable support 60 for the comfort of the occupant. In one embodiment, the adjusters 64 may be generally aligned in one or more grid patterns in the adjustable support 60 having one or more rows and one or more columns. The rows/columns may vary as they extend across the grid pattern.

Figures 7, 8:
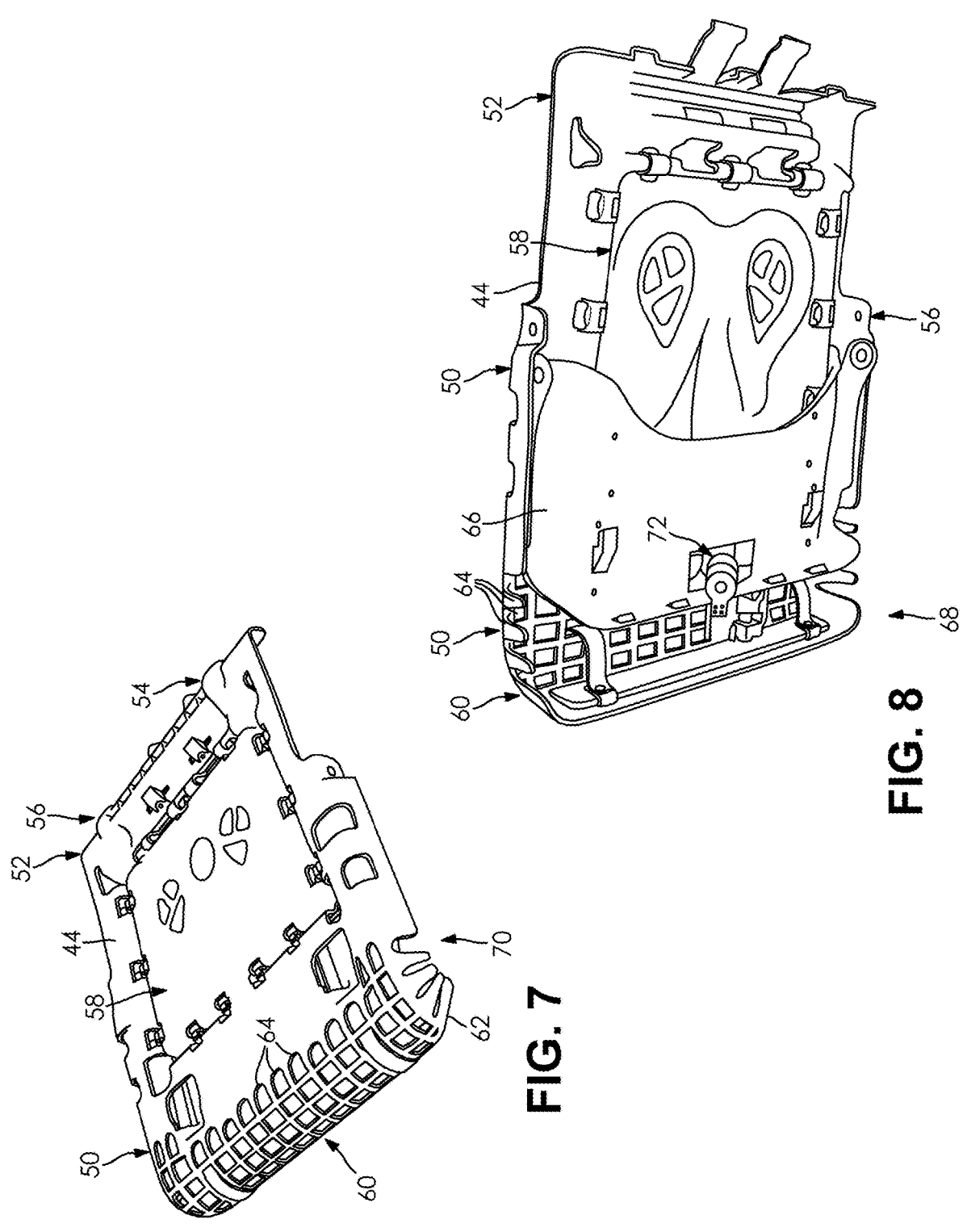
FIG. 7 is a schematic lower perspective view of components of the seat base assembly in a retracted condition.
FIG. 8 is a schematic lower perspective view of components of the seat base assembly in an extended condition.

The adjustable support 60 may be attached to the seat base frame portion 30A or components thereof, such as a seat pan 66. As shown in FIG. 8, the adjustable support 60 may have a portion that extends through the seat pan 66 to secure them together.

In certain embodiments, the adjustable support 60 is selectively positionable between an extended position 68 and a retracted position 70. A drive mechanism 72, one embodiment of which is depicted in FIGS. 12-26, may be employed to cause the adjustable support 60 to be selectively positioned anywhere between the extended position 68 and the retracted position 70.

The drive mechanism 72 may be manual, automatic, or partially automatic. The drive mechanism 72 may be in electrical communication with a controller (not depicted) and a power source (not depicted). The drive mechanism 72 may be disposed under and/or within the base seat assembly 32 but it may be located elsewhere too.

The drive mechanism 72 may be engaged by the occupant via one or more buttons on a side panel of the seat base assembly 32, which may be appreciated from FIGS. 1-4. In other embodiments, the drive mechanism 72 may be engaged by one or more sensors in the seat base assembly 32, and/or by voice, touch screen or remote operation.

The drive mechanism 72 may be comprised of one or more electric motors but pneumatics, hydraulics and/or other biasing members may be used. In each case, it is preferred that the drive mechanism 72 be reversible so that it provides motion along both longitudinal directions.

The drive mechanism 72 may be comprised of an upper slide 74 and a lower slide 76. The slides 74, 76 may each be one piece, unitary and integrally formed out of metal, polymer or composite materials. In other cases, combinations of the forgoing materials may be used.

The lower slide 76 may be connected to the seat base assembly 32 or other fixed structure. The connection may be such as a fixed, or stationary, connection. In some cases, the lower slide 76 may be connected to the seat pan 66 of the seat base assembly 32 such as through mechanical fasteners. Additionally or alternatively, the lower slide 76 can be connected to the seat rails, cross-pieces and/or frame work for the seat.

The lower slide 76 may have first and second side portions 78, 80. In some embodiments, the first and second side portions 78, 80 may comprise first and second slide channels. In one case, the first and second slide channels 82, 84 may extend from an upper surface 86 of each of the side portions 78, 80. The slide channels 82, 84 may extend entirely along the side portions 78, 80 or only a portion of their length. Each slide channel 82, 84 may be continuous or non-continuous. In some cases, the slide channels 82, 84 may be mirror images of each other.

Each slide channel 82, 84 may have an inner wall 88 and an upper wall 90. The inner walls 88 of the first and second slide channels 82, 84 may extend parallel to one another. The inner walls 88 may also extend generally transverse to all upper surface 92 of the lower slide 76. Each upper wall 90 may be cantilevered from the respective inner wall 88 such that the upper wall 90 may extend over the upper surface 92. The slide channels 82, 84 may each generally have a C-shaped cross-section where the C-shape of the first slide channel 82 faces the C-shape of the second slide channel 84 across a central portion 94 of the lower slide 76.

The slide channels 82, 84 may be separated from one another on the lower slide 76 by the central portion 94. In some cases, the central portion 94 may have a motor aperture 96. The motor aperture 96 may be located in a front area 98 of the central portion 94 and generally centered between the slide channels 82, 84. The motor aperture 96 extends through the lower slide 76 from the upper surface 92 to a lower surface 100. The motor aperture 96 may have a generally square or rectangular shape.

Adjacent to the motor aperture 96 a perimeter portion 102 of the lower slide 76 may form a motor mount 104. Thus, in some cases the motor mount 104 may be in the front area 98 of the central portion 94 of the lower slide 76. The motor mount 104 may extend below the upper surface 86 in a generally transverse manner with respect to the upper surface 86. Fastener apertures 106 may be located through the motor mount 104. The apertures 104 may generally extend in a transverse direction to the generally vertical extension of the motor mount 104.

The motor mount 104 may also have a linkage channel 108. The channel 108 may be such as a generally U-shaped depression in the motor mount 104. The channel 108 may be located between the two fastener apertures 106. The channel 108 may be located along a longitudinal axis 110 of the lower slide 76.

The central portion 94 may also have a central channel 112. The central channel 112 may create a recess or depression in the lower slide 76 at least partially along the longitudinal extension of the lower slide 76. The central channel 112 may be laterally bounded by two side walls 114 that extend parallel to one another. The side walls 114 may be connected together by a base wall 116 that may extend generally transverse to the side walls 114. The base wall 116 may be located vertically below the side walls 114. On one end portion, the central channel 112 may form a terminal wall 118 for the motor aperture 96. In some cases, the central channel 112 may be bisected by the longitudinal axis 110 of the lower slide 76.

A pinion aperture 120 may be located adjacent to the motor aperture 96, thus it may also be located in the front area 98 of the central portion 94. The pinion aperture 120 extends from the upper surface 92 to the lower surface 100. The pinion aperture 120 may be generally circular in its dimension.

In some cases, there may be only one pinion aperture 120. In such a case, the pinion aperture 120 may make the lower slide 76 non-symmetrical about the longitudinal axis 110. In the absence of the pinion aperture 120, the lower slide 76 may be symmetrical about the longitudinal axis 110.

A pinion 122 may be located through the pinion aperture 120. The pinion 122 may have a rod-like body portion 124 terminating in a gear head 126. The gear head 126 may have a larger diameter than the body portion 124 and the pinion aperture 120. The gear head 126 may be located adjacent the upper surface 92 of the lower slide 76 while the body portion 124 extends through the aperture 120 and extends below the lower surface 100 of the lower slide 76. The body portion 124 may extend generally transverse to the longitudinal axis 110 of the lower slide 76.

The upper slide 74 may be comprised of first and second side portions 128, 130 separated from one another by a central portion 132. Each side portion 128, 130 may have a runner 134 on a laterally outboard portion 136 thereof. The runners 134 may extend the length of the side portions 128, 130, or only portions thereof. The extension may be continuous or non-continuous. The runners 134 may extend generally parallel and coplanar with one another. The runners 134 may be such as strips of material having an inside edge 138 attached to the side portions 128, 130 and a free outside edge 140 cantilevered from the side portions 128, 130. The runners 134 may be a fraction of the height of the upper slide 74 such as between 5-25 percent of the upper slide 74 height.

An upper surface 142 of the upper slide 74 may be generally planar but not coplanar with the runners 134. In such a case, a side wall 144 may connect each runner 134 with the upper surface 142. The side walls 144 may be continuous, parallel to one another and of substantially equal height. In some cases, reinforcing ribs 146 may be formed with the upper surface 142 to enhance the rigidity of the upper slide 74.

A lower surface 148 of the upper slide 74 may have at least one linkage flange 150 extending therefrom. The linkage flange 150 may extend generally transverse the lower surface 148. The linkage flange 150 may extend from a rear central portion 152 of the upper slide 76.

In some cases, there may be two linkage flanges 150A, 150B that extend generally parallel to one another. The linkage flanges 150A, 150B may share the same size, shape and longitudinal position on the upper slide 74. The linkage flanges 150A, 150B may be located on opposite sides of a longitudinal axis 154 of the upper slide 74. Linkage fastener apertures 156 may extend through the flanges 150A, 150B and be aligned with one another.

The upper slide 74 may have a forward edge portion 158. Two outboard lateral portions 160 of the forward edge portion 158 may have connector portions 162. The connector portions 162 may have features that connect to a pusher 164. In some cases, the connector portions 164 may have receptacles 166 for receiving portions of the pusher 164 therein. The receptacles 166 may be cantilevered from the forward edge portion 158. The receptables 166 may have two side walls 168, a front wall 170, a base wall 172, a rear wall 174 and an open top 176. The front wall 170 may have a depression 178 therein, such as a semi-hemispherical depression. The receptacles 166 may be adapted to receive complementary shaped blocks from the pusher 164 therein.

The rear wall 174 may be the same as, or related to, the forward edge portion 158. In one embodiment, the rear wall 174 of each receptable 166 may have a fastener aperture 180 adapted to receive a fastener extending from the pusher 164.

The upper slide 74 may be positioned so that it at least partially overlaps the lower slide 76. In some cases, the side portions 128, 130 of the upper slide 74 may be at least partially located within the side portions 78, 80 of the lower slide 76. In one example, the runners 134 of the upper slide 74 may be located, sized and shaped so that they may selectively longitudinally move within the slide channels 82,84 of the lower slide 76. In such a case, upper surfaces 182, Y the outside edges 140 and/or lower surfaces 184 of the runners 134 may be in direct facing contact with the upper wall 90 and the inner wall 88, respectively, of the slide channels 82,84 and/or the upper surface 92 of the lower slide 76. When so connected the longitudinal axis 110, 154 of the upper and lower slides 74, 76 may extend parallel to one another and may overlap. In the connected condition, the linkage flanges 150A, 150B of the upper slide 74 may move longitudinally within the central channel 112 of the lower slide 76.

The drive mechanism 72 may also be comprised of a linkage member 186 that may extend within the linkage channel 108 generally longitudinally between the upper slide 74 and the lower slide 76. As such, the linkage member 186 may extend generally parallel to the runners 134. The linkage member 186 may also have a longitudinal axis 188 that extends parallel the upper and lower slide axis 110,154. In one case, the linkage member 186 may be such as a threaded rod or worm gear. A rear end portion 190 of the linkage member 186 may have a flange 192 with an aperture 194 extending therethrough. The aperture 194 in the linkage member 186 may align with the linkage fastener apertures 156.

A fastener 196 may be located through the linkage member flange aperture 194 and the flange apertures 156 of the upper slide 74 to secure the linkage member 186 to the upper slide 74. The fastener 196 may be such as a pin having a generally cylindrical body and a head portion at one end of the body. The head portion may have a larger diameter than a diameter of the body and a diameter of the linkage member flange aperture 194 and flange apertures 156. The fastener 196 may extend generally transverse the linkage member 186.

The linkage member 186 may have a forward end portion 198 and a body portion 200. The forward end portion 198 and/or the body portion 200 are adapted to be connected to a transmission portion 202 of a motor 204. In one case, the transmission portion 202 may be such as a worm drive capable of rotating the linkage member 186 in a clockwise and a counterclockwise direction. The transmission portion 202 may also comprise gears that step down the rotational speed of the motor 202 and/or change rotational torque. In some cases, the linkage member 186 is inserted into an aperture 206 of the transmission portion 202 where the worm drive extends at least partially into the aperture 206. The worm drive and threads on the linkage member 186 engage so that rotation of the worm drive rotates the linkage member 186.

The transmission portion 202 of the motor 204 may be directly connected to the motor 204. The transmission portion 202, and thus the motor 204, may be connected to the lower slide 76 by one or more fasteners 208 extending through the transmission portion 202 and into the apertures 106 in the motor mount 104. The fastener 208 may extend into the motor mount 104 generally parallel to the linkage member 186.

In some cases, the motor 204 may extend below the lower slide 76. The extension may be such as an acute angle with respect to the lower surface 100 of the lower slide 76.

One embodiment of the pusher 164 is depicted in FIGS. 22-26. The pusher 164 may be constructed of polymeric material, but other materials may be used. The pusher 164 may be one-piece, unitary and integrally formed.

In some cases, the pusher 164 may have a front portion 210 and a rear portion 212. The rear portion 212 may have a width the same or similar to a width of the central portion 132 of the upper slide 74. The rear portion 212 may be adapted to extend at least partially over the central portion 132. The extension may be such as in a directly overlapping orientation with no intervening structures. In other words, the upper surface 142 of the central portion 132 may be in direct facing contact with a lower surface 214 of the rear portion 212.

The rear portion 212 of the pusher 164 may be attached to the upper slide 74 with mechanical fasteners. In one example, fastener apertures 216 in the rear portion 212 may be aligned with fastener apertures 218 in the central portion 132. Fasteners 220 may extend through the apertures 216, 218.

The front portion 210 of the pusher 164 may extend in front of the rear portion 212 and the front portion 210 may have a width that is larger than the width of the rear portion 212. In some cases, the larger width of the front portion 210 compared to the rear portion may provide the pusher 164 with a general T-shape. The front portion 210 may extend at least partially transverse to the rear portion 212 such that a lower portion 222 of the front portion 210 extends below the lower surface 214 of the rear portion 212. The front portion 210 may extend entirely or substantially entirely across the width of the seat base assembly 32.

The front portion 210 of the pusher 164 may have a front surface 226 that has an arc shape. In some cases, the pusher 164 may be symmetrical about a longitudinal axis 228 which the pusher 164 may share with the upper and lower slides 74, 76. The front surface 226 may be swept rearwardly, toward the slides 74, 76, from the axis 228.

In some cases, the pusher 164 may have a rear surface 230. The rear surface 230 may be opposite the front surface 226. The rear surface 230 may have a generally linear extension across the width of the front portion 210.

Fastener apertures 232 may be located in the front surface 226 and extend through the front portion 210 to the rear surface 230. The apertures 232 may be aligned with the apertures 180 in the receptors of the upper slide 74. Fasteners 234 may be located through the apertures 180,232 to secure the pusher 164 to the upper slide 74.

Figures 9, 10:
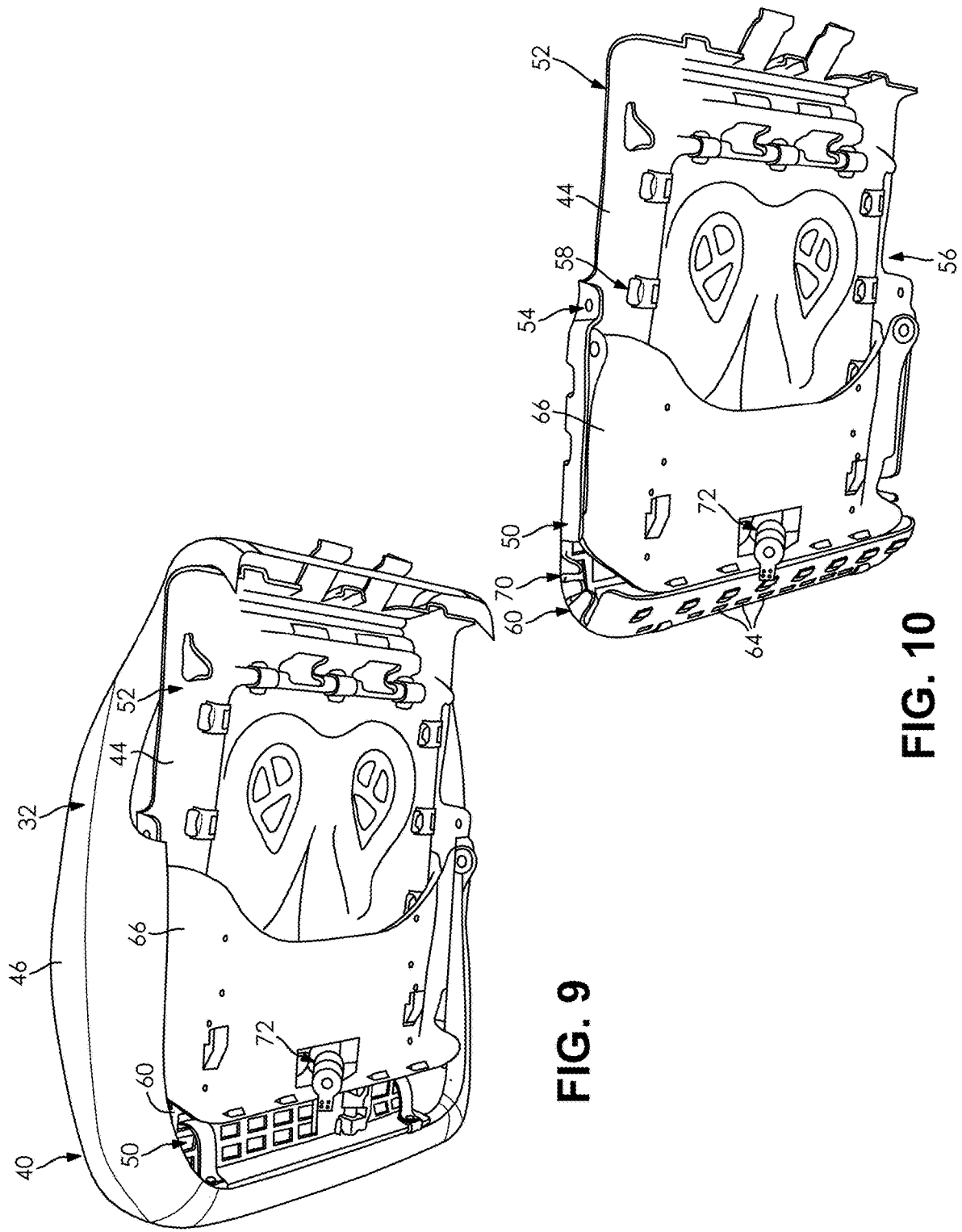
FIG. 9 is a schematic lower perspective view of components of the seat base assembly in an extended condition.
FIG. 10 is a schematic lower perspective view of components of the seat base assembly in a retracted condition.

In some embodiments, the seat base substrate 44 may extend at least partially over the pusher 164, which may be appreciated from FIGS. 8-9. It may be preferred that the adjustable support 60 extends over the front and rear portions 210,212 of the pusher 164. The adjustable support 60 may also extend over the front surface 226 of the pusher 164.

It may be that the adjustable support 60 is attached to the pusher 164. The attachment may be through mechanical fasteners, straps, strings, wires, and/or the like.

Figures 11, 12:
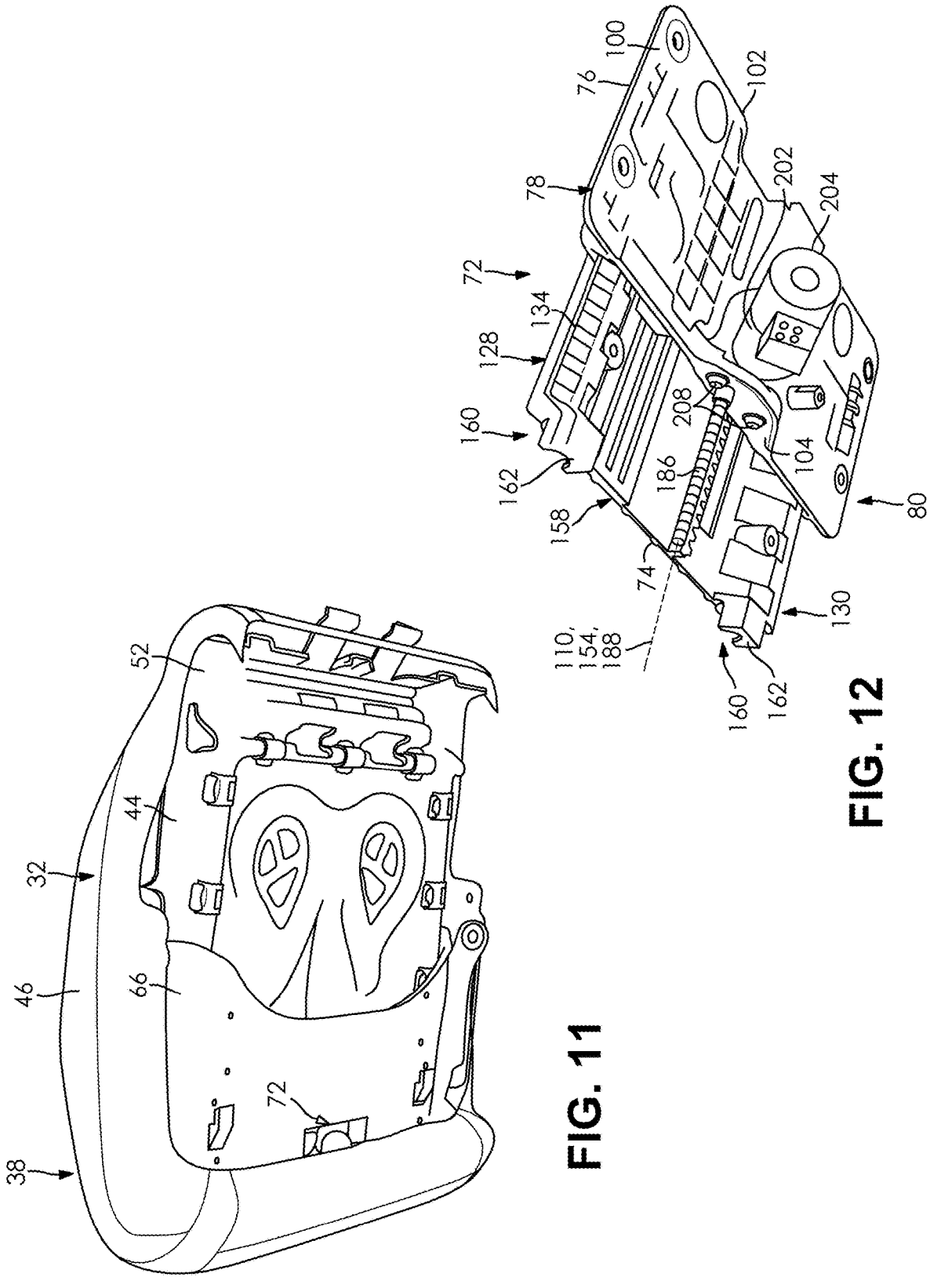
FIG. 11 is a schematic upper perspective view of one embodiment of a seat base substrate in a retracted condition.
FIG. 12 is a schematic lower perspective view of components of a drive mechanism in an extended condition.
Figure 13:
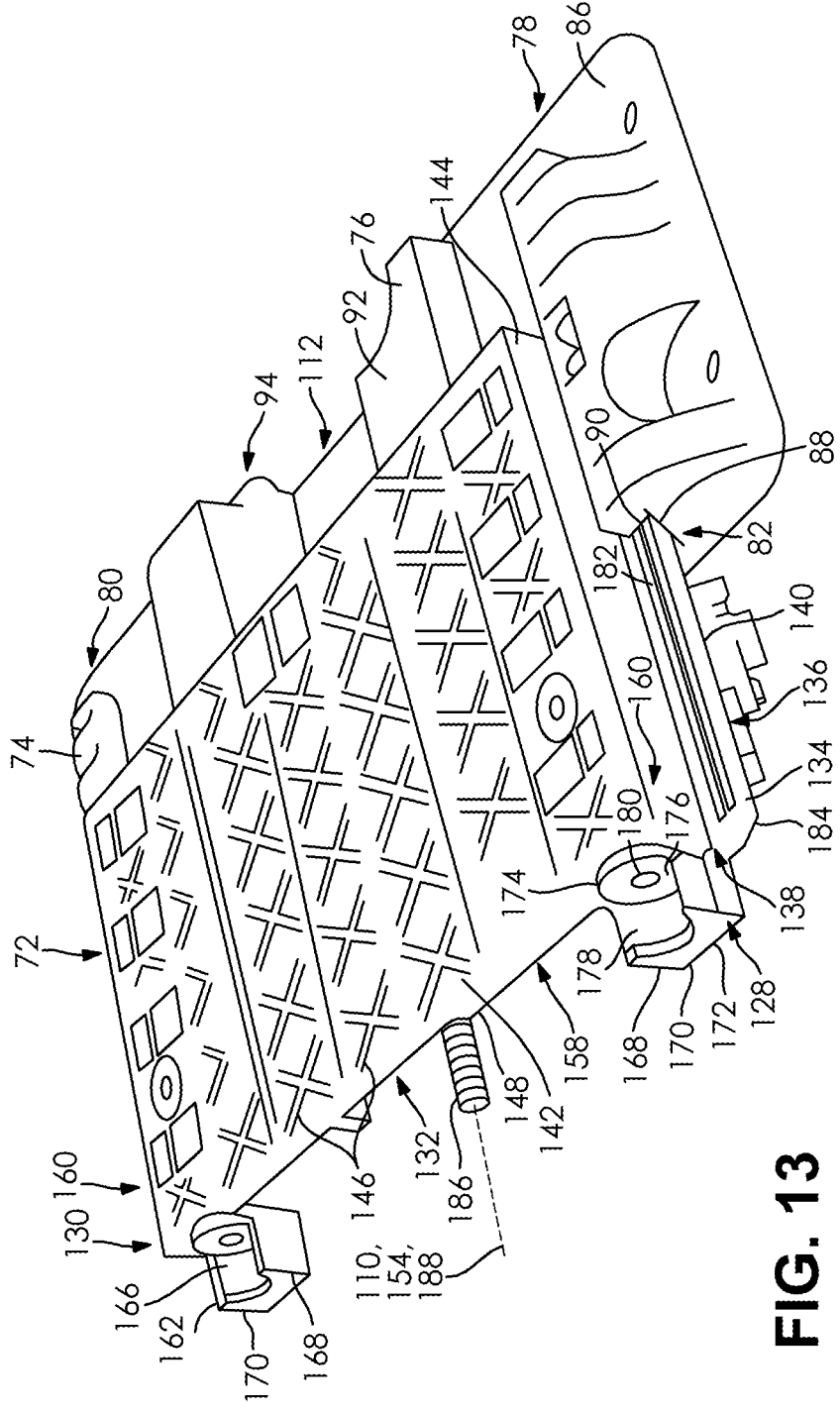
FIG. 13 is a schematic upper perspective view of a drive mechanism in an extended condition.
Figure 14:
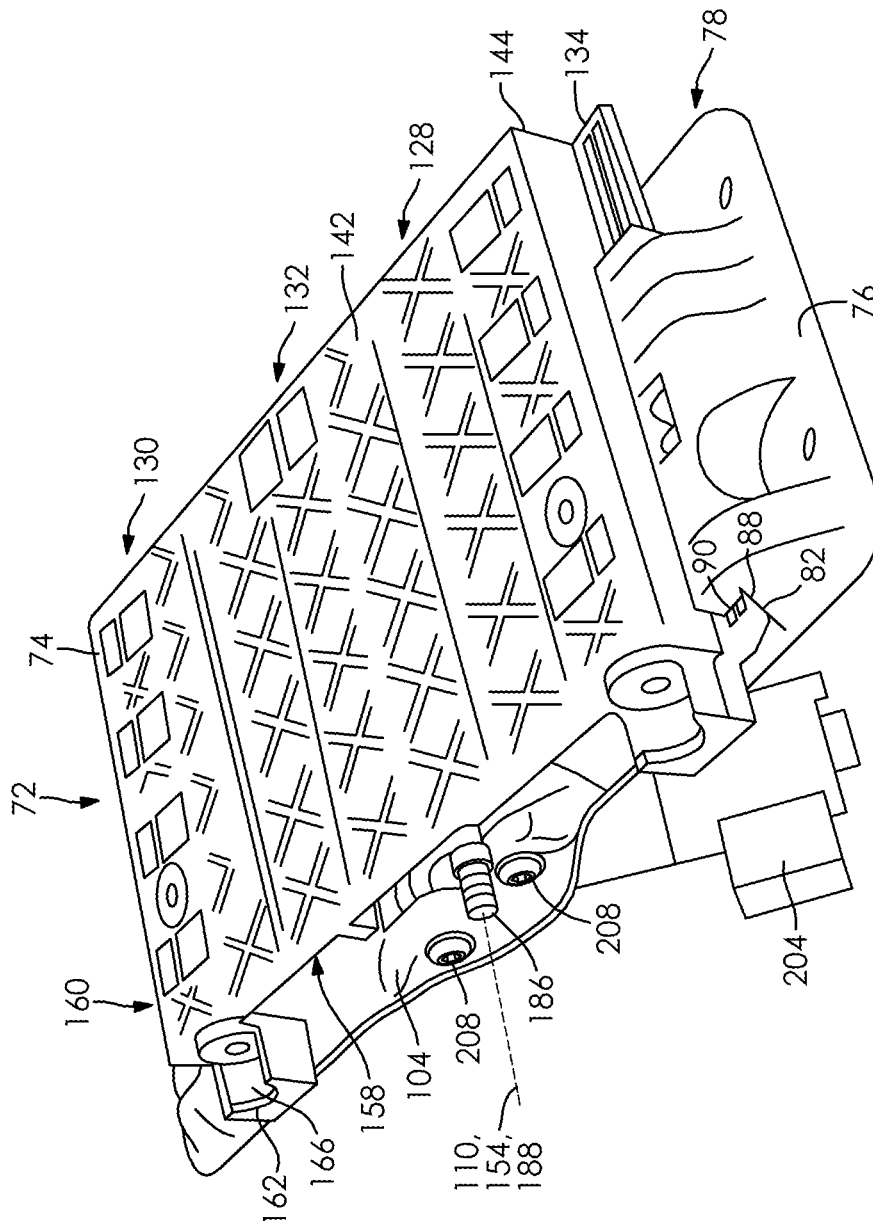
FIG. 14 is a schematic upper perspective view of a drive mechanism in a retracted condition.
Figures 15, 16:
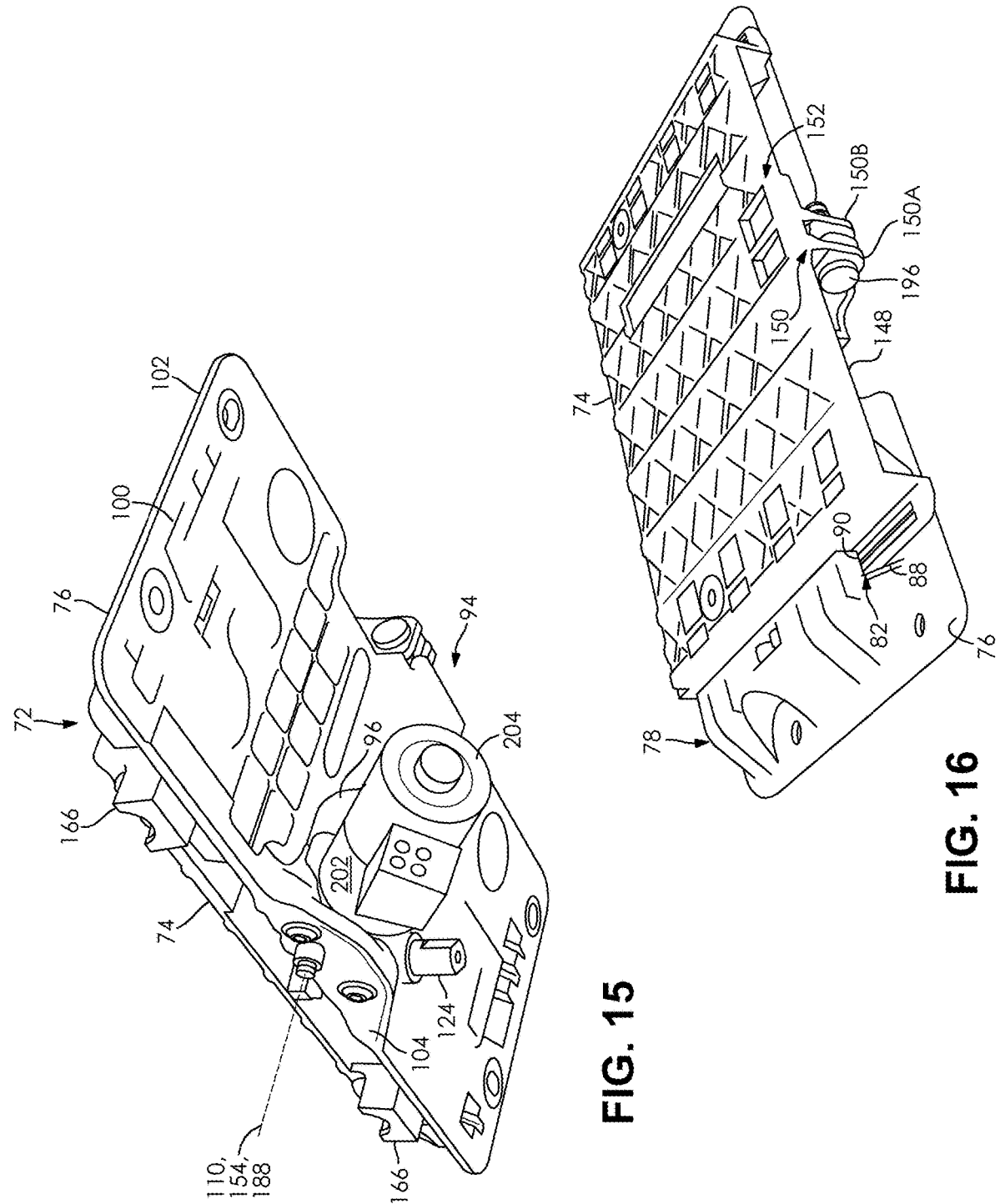
FIG. 15 is a schematic lower perspective view of a drive mechanism in a retracted condition.
FIG. 16 is a schematic lower perspective view of a drive mechanism in a retracted condition.
Figure 17:
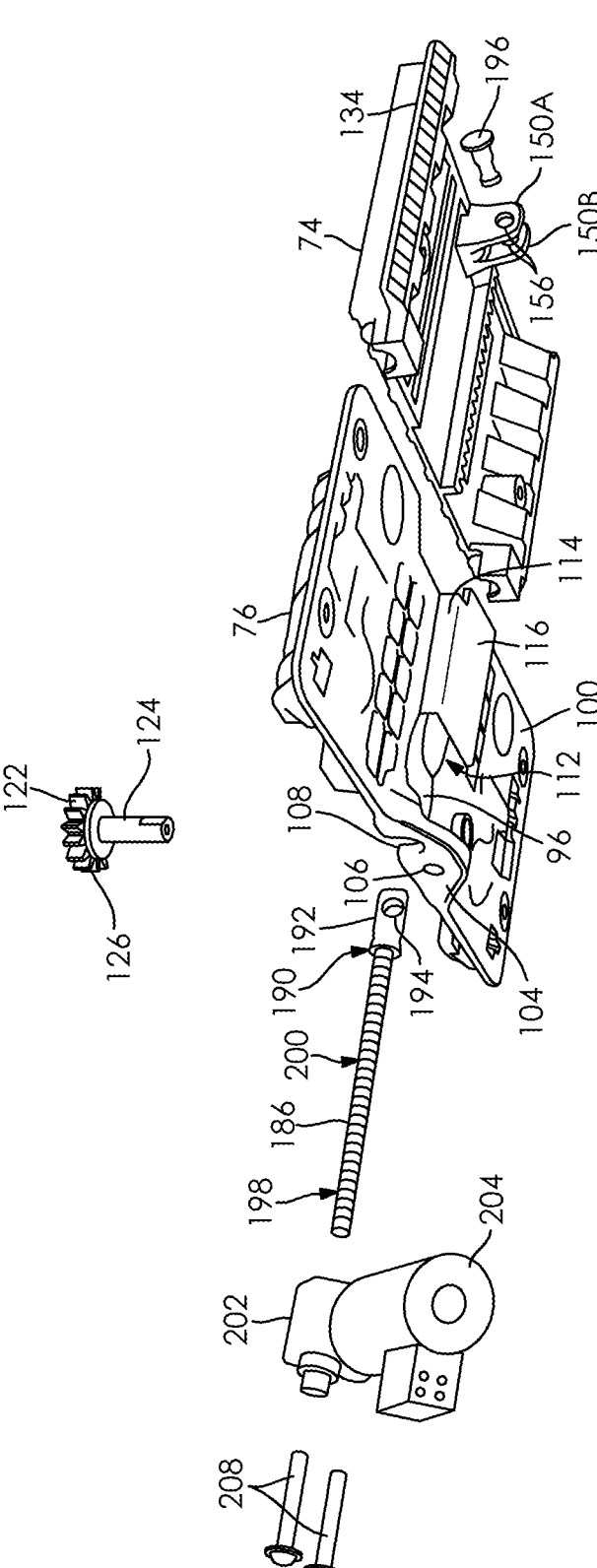
FIG. 17 is a schematic, exploded lower perspective view of a drive mechanism.
Figure 18:
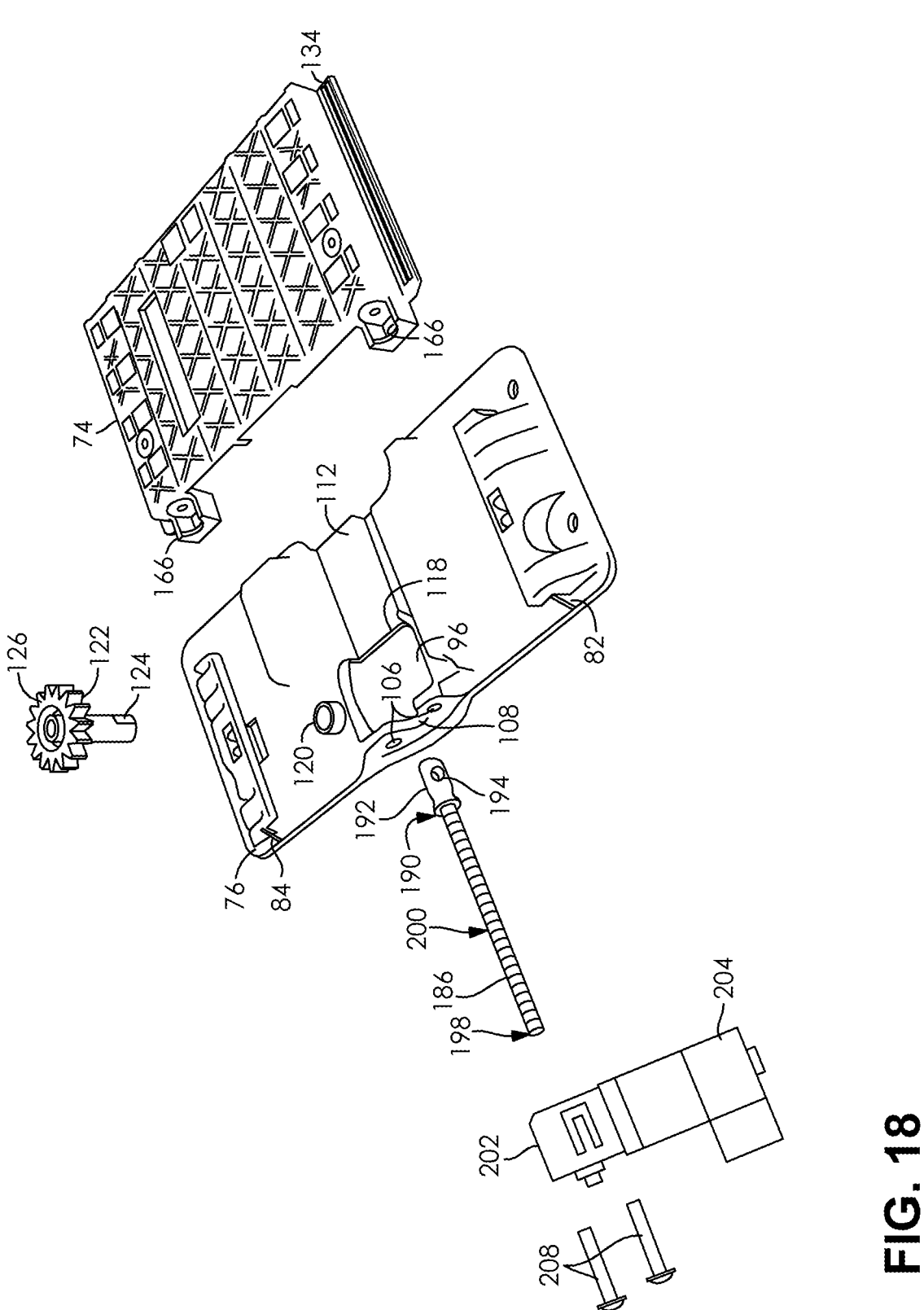
FIG. 18 is a schematic, exploded upper perspective view of a drive mechanism.
Figure 19:
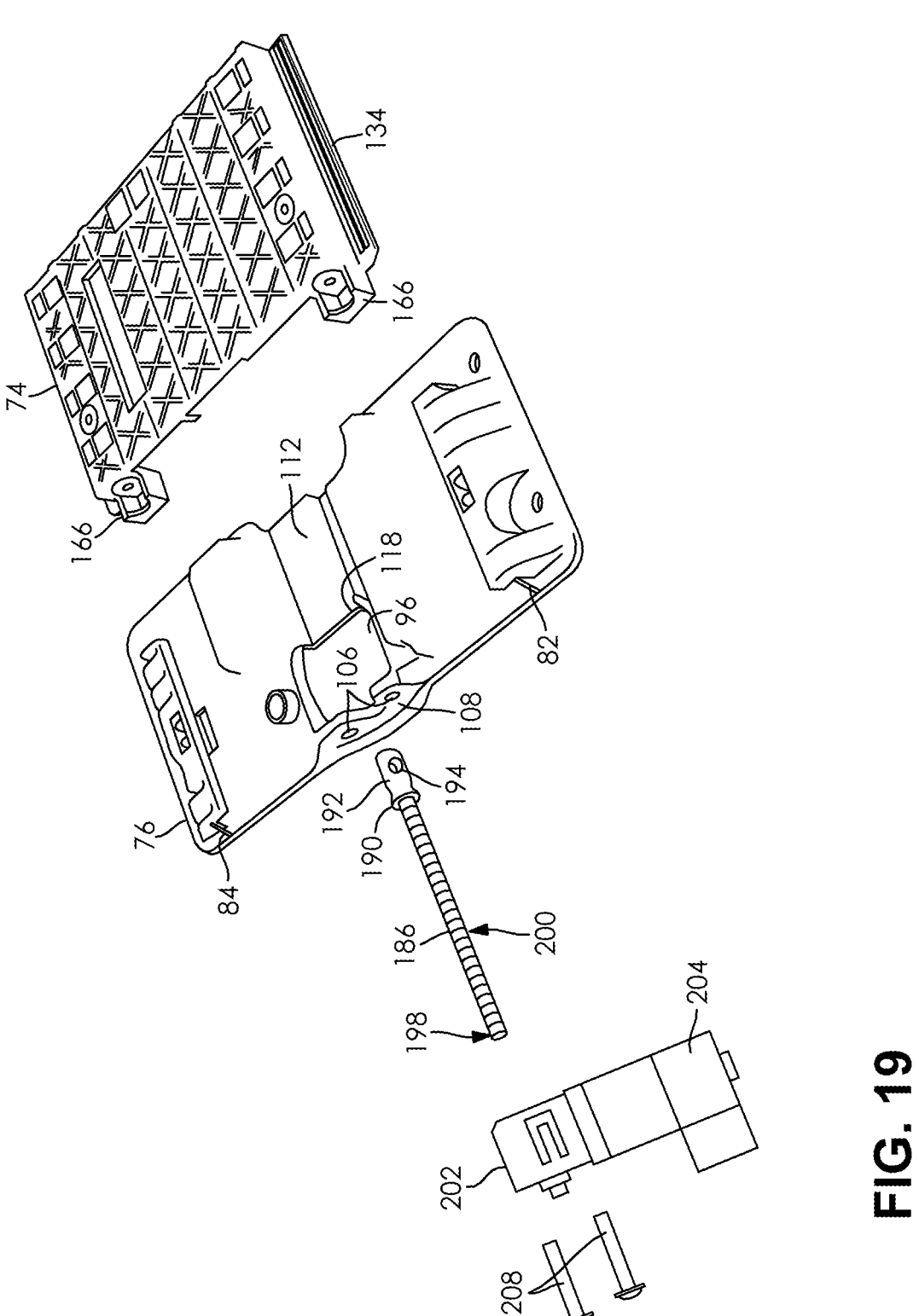
FIG. 19 is a schematic, exploded upper perspective view of a drive mechanism.
Figure 20:
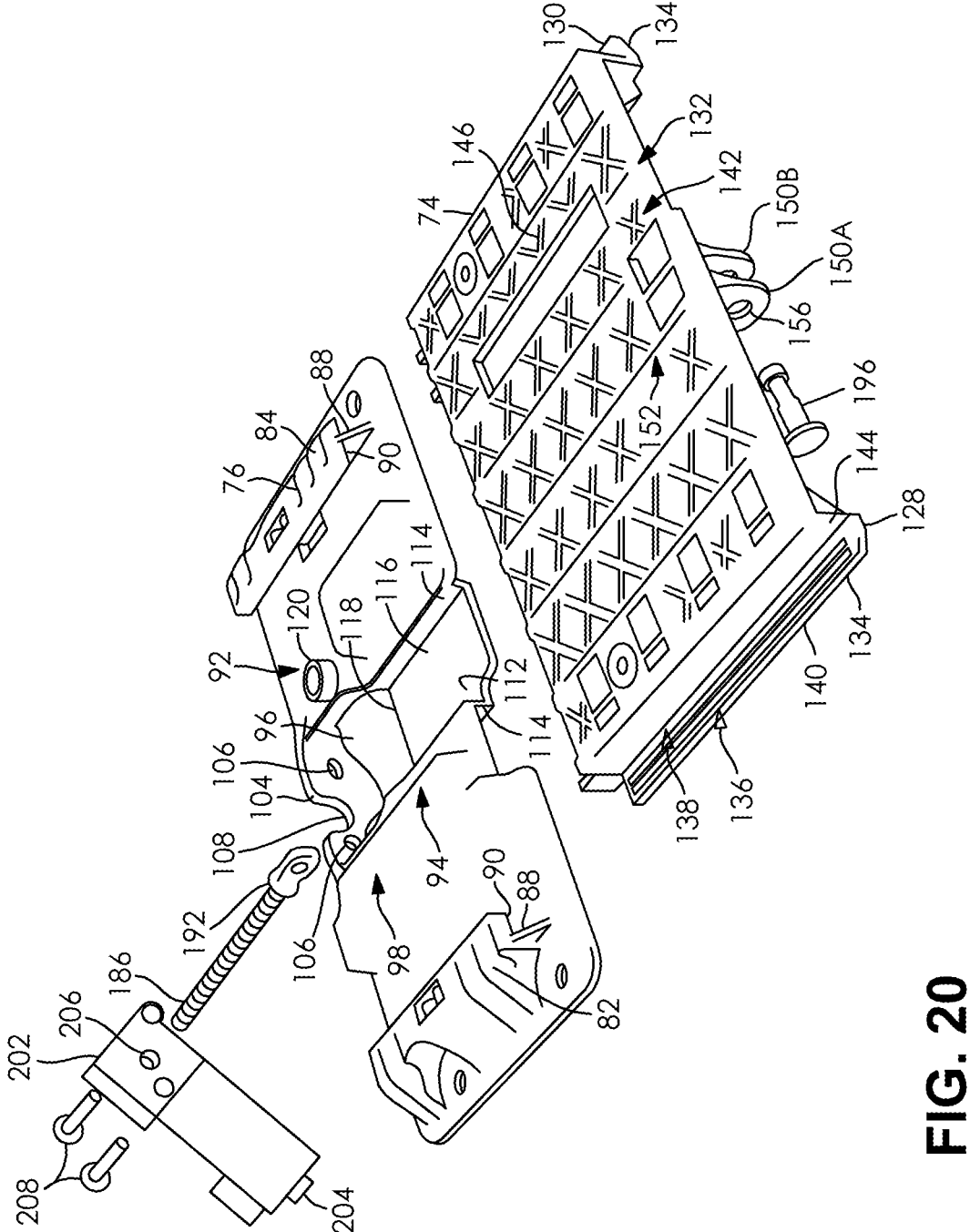
FIG. 20 is a schematic, exploded upper perspective view of a drive mechanism.
Figure 21:
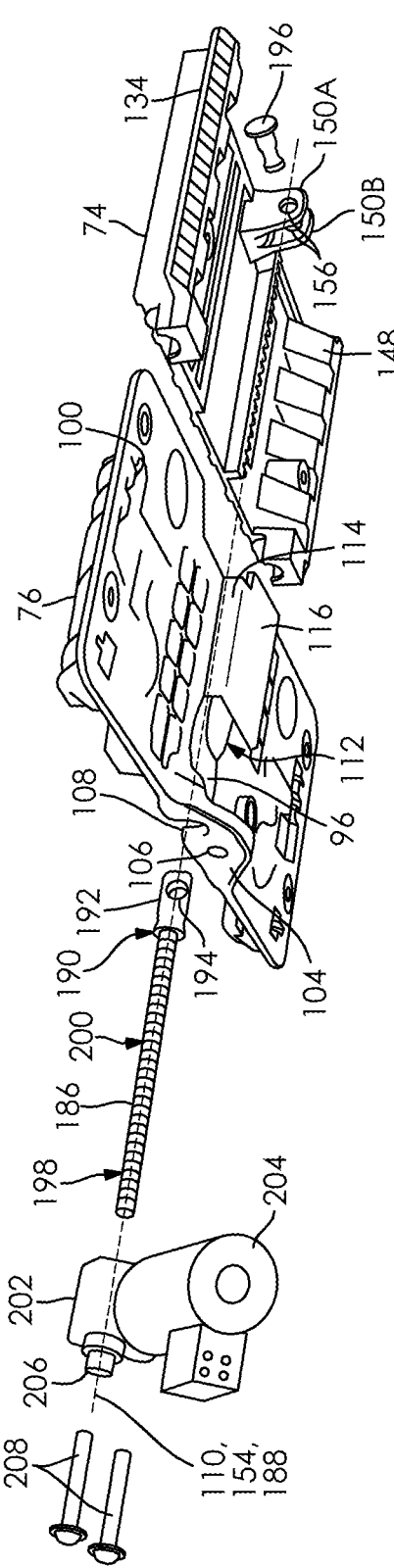
FIG. 21 is a schematic, exploded lower perspective view of a drive mechanism.
Figures 22, 23:
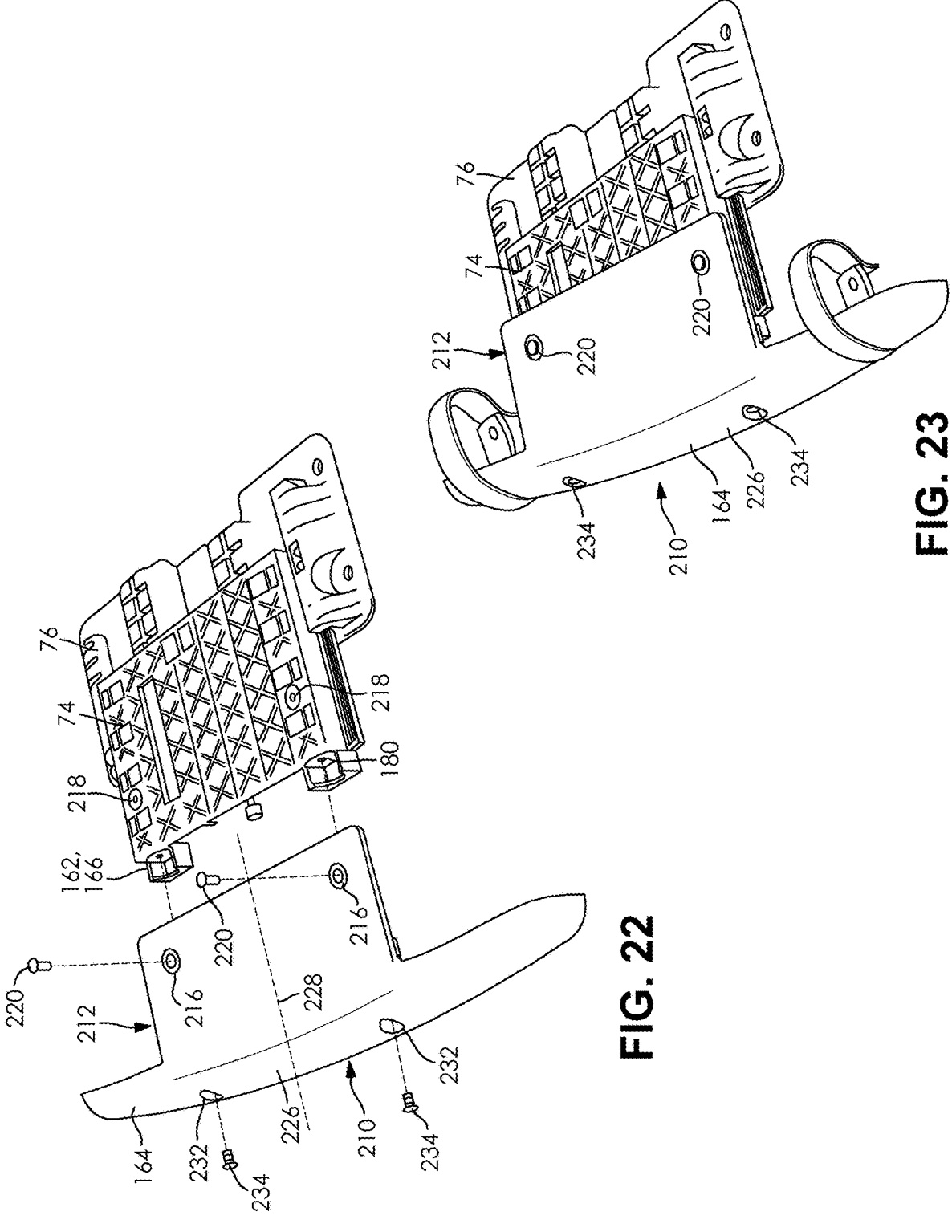
FIG. 22 is a schematic, exploded upper perspective view of a drive mechanism in an extended condition and a pusher.
FIG. 23 is a schematic upper perspective view of a drive mechanism in an extended condition and a pusher.
Figures 24, 25:
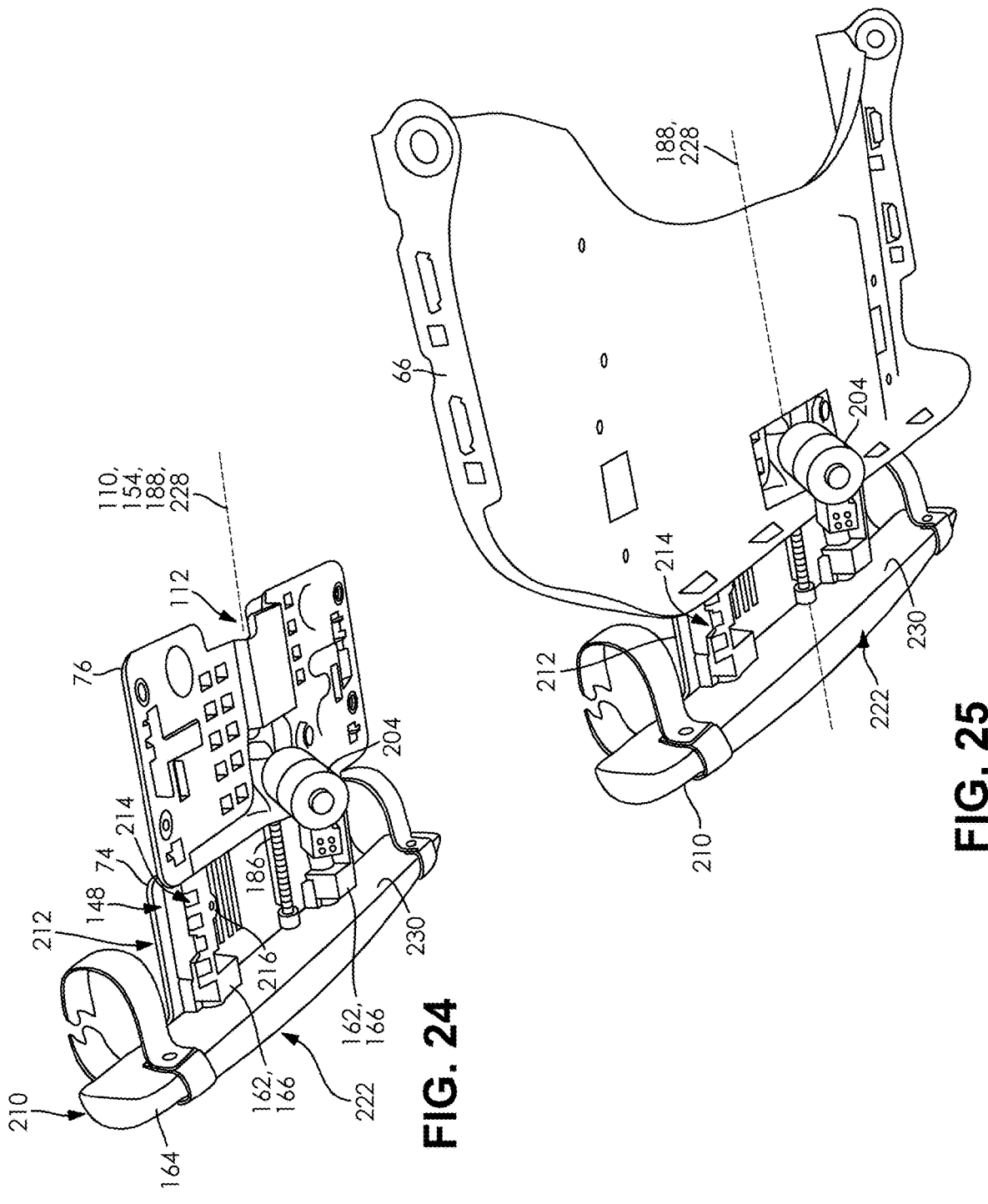
FIG. 24 is a schematic lower perspective view of a drive mechanism in an extended condition and a pusher.
FIG. 25 is a schematic lower perspective view of a drive mechanism in an extended condition, a pusher and a seat pan.
Figure 26:
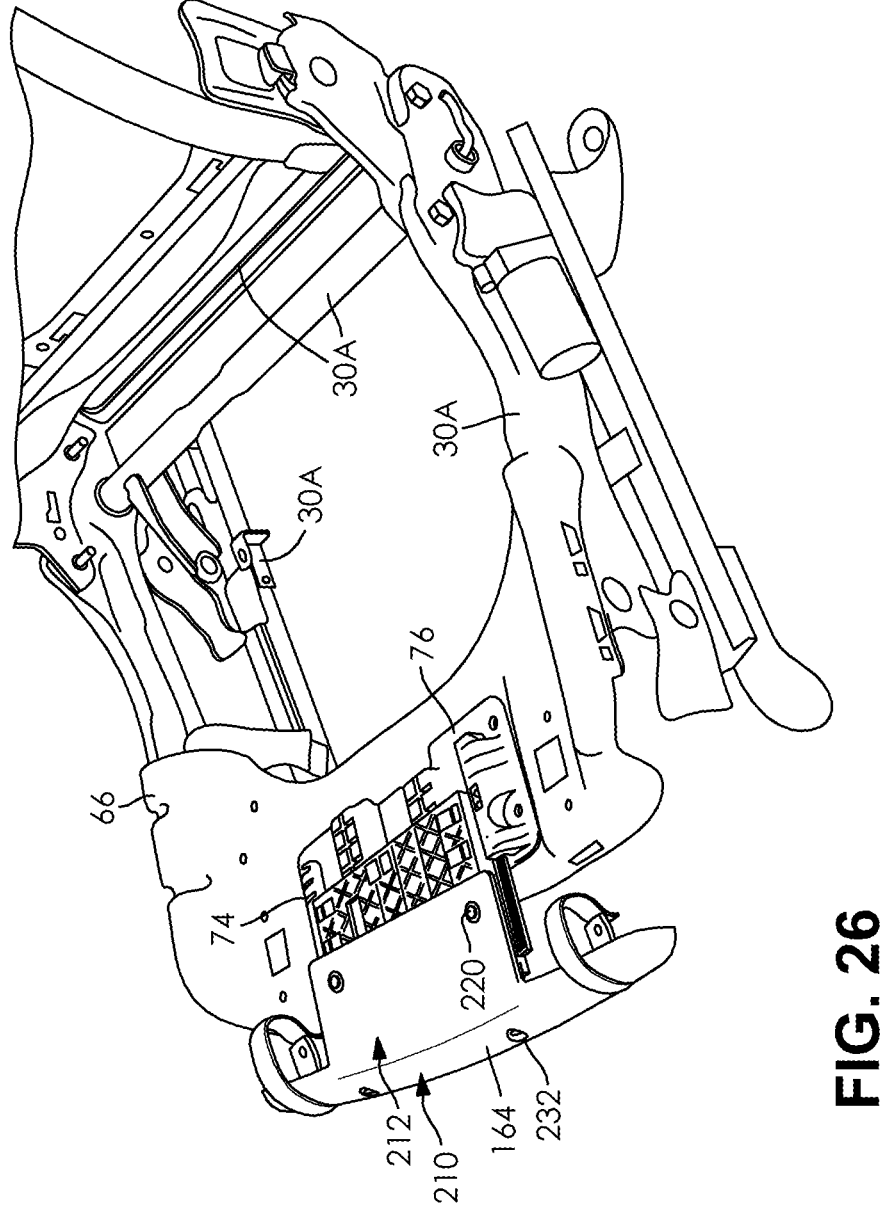
FIG. 26 is a schematic upper perspective view of a drive mechanism in an extended condition, a pusher and a seat base assembly.

From the above, starting from a retracted condition 38, it can be appreciated that when the upper slide 74 extends in the longitudinal direction, the pusher 164 simultaneously moves in the same amount in the longitudinal direction. FIGS. 7, 10 and 11 depict one embodiment where the adjustable support 60 is in a curled position. FIGS. 14, 15 and 16 depict the upper slide 74 in the retracted condition. The pusher 164 causes the curled adjustable support 60 to begin to uncurl and begin to extend in the longitudinal direction. The adjustable support 60 may be moved from the fully curled to a substantially flat orientation and anywhere in between via the mechanisms noted herein. FIGS. 5, 6, 8 and 9 depict one embodiment where the adjustable support 60 is in an extended condition 40. FIGS. 12, 13, 23, 24, 25, and 26 depict the upper slide 74 in the extended condition 40.

The seat cover 46 may extend entirely or partially over the seat base substrate 44 and/or pusher 164 at least in some locations. The seat cover 46, via at least partially its attachment to the pusher 164, remains in an intentionally taut and relatively wrinkle free-condition whether the seat system 30 is located in the retracted condition 38 or the extended condition 40 and everything in between.

The cover 46 may be a single material or it may be comprised of several materials. In some embodiments, a stretch material may be incorporated into the cover 46 to accommodate its movement between the extended and retracted conditions 38,40. The stretch material may assist in reducing noise associated with movement by the cover 46 and in eliminating wrinkles.

From the foregoing, it can be readily appreciated that the seat system 30 can comfortably accommodate a wider range of potential occupants compared with previous seats. For example, by its adjustability, the seat system 30 may accommodate at least a female occupant in the fifth percentile of height and weight and up to but not limited to a male occupant in the ninety-fifth percentile of height and weight.

While various embodiments have been described above, it should be understood that they have been presented by way of example, and not limitation. It will be apparent to persons skilled in the relevant arts that the disclosed subject matter may be embodied in other specific forms without departing from the spirit or essential characteristics thereof. The embodiments described above are therefore to be considered in all respects as illustrative, not restrictive.

What is claimed is:

1. A drive mechanism for a seat cushion length extender, comprising:
a lower slide having two lateral side portions bounding a central portion, wherein an area of the central portion is recessed below the lateral side portions, and another portion of the central portion comprises a motor aperture,
an upper slide having rails slidably engaged with the lateral side portions and at least one linkage flange with an aperture extending from a lower surface of the upper slide,
a linkage member comprising a threaded rod having a flange end with an aperture therethrough; and
a pin located through the linkage flange aperture and the linkage member aperture;
wherein receptacles adapted to receive portions of a pusher are located at laterally outboard portions along a forward portion of the upper slide.

2. The drive mechanism of claim 1, wherein the lower slide, the upper slide and the threaded rod each have longitudinal axis that are parallel to one another.

3. The drive mechanism of claim 1, wherein the lateral side portions of the lower slide define slide channels.

4. The drive mechanism of claim 2, wherein the recessed area of the central portion is longitudinally aligned with the longitudinal axis of the threaded rod.

5. The drive mechanism of claim 4, wherein the central portion has a motor mount with a depression therein for the threaded rod, wherein two transmission fastener apertures are located on either side of the depression.

6. The drive mechanism of claim 5, wherein the motor mount at least partially bounds the motor aperture.

7. The drive mechanism of claim 5, wherein one portion of a motor extends into the motor mount.

8. The drive mechanism of claim 1, wherein the rails of the upper slide are located laterally outboard of a central portion of the upper slide.

9. The drive mechanism of claim 1, wherein the recessed area of the lower slide is sized and shaped to selectively receive the linkage flange of the upper slide.

10. The drive mechanism of claim 1, wherein a pinion aperture is located through the lower slide in a forward central portion of the lower slide.

11. The drive mechanism of claim 5, wherein the transmission fasteners extend into the motor mount parallel to the threaded rod.

12. The drive mechanism of claim 1, wherein the pin extends transverse to the threaded rod.

13. The drive mechanism of claim 1, wherein the threaded rod extends parallel to the rails.

14. The drive mechanism of claim 1, wherein each of the upper and lower slides are one-piece, unitary and integrally formed.

15. A drive mechanism for a seat cushion length extender, comprising:
a lower slide having two lateral side portions bounding a central portion, wherein the central portion comprises a motor aperture,
an upper slide having rails slidably engaged with the lateral side portions,
a linkage member comprising a threaded rod,
wherein the central portion has a motor mount with a depression therein for the threaded rod, wherein two transmission fastener apertures are located on either side of the depression.

16. The drive mechanism of claim 15, wherein the motor aperture extends through the lower slide from an upper surface of the lower slide to a lower surface of the lower slide.

17. The drive mechanism of claim 15, further comprising a pin, wherein the upper slide has at least one linkage flange with an aperture extending from a lower surface of the upper slide, wherein the threaded rod has a flange end with an aperture therethrough, and wherein the pin is located through the linkage flange aperture and the linkage member aperture.

18. A drive mechanism for a seat cushion length extender, comprising:
a lower slide having two lateral side portions bounding a central portion,
an upper slide having rails slidably engaged with the lateral side portions,
a linkage member comprising a threaded rod having a flange end with an aperture therethrough;
wherein receptacles for receiving portions of a pusher are located at laterally outboard portions along a forward portion of the upper slide.

19. The drive mechanism of claim 18, wherein the central portion comprises a motor aperture and wherein the upper slide has at least one linkage flange with an aperture extending from a lower surface of the upper slide.

20. The drive mechanism of claim 19, further comprising a pin located through the linkage flange aperture and the linkage member aperture.

* * * * *